United States Patent
Adams et al.

(10) Patent No.: US 7,042,441 B2
(45) Date of Patent: May 9, 2006

(54) INPUT DEVICE INCLUDING A SCROLL WHEEL ASSEMBLY FOR MANIPULATING AN IMAGE IN MULTIPLE DIRECTIONS

(75) Inventors: Aditha M. Adams, Seattle, WA (US); Steven N. Bathiche, Redmond, WA (US); Steven W. Fisher, Edmonds, WA (US); Gino Garcia, Edmonds, WA (US); Daan Lindhout, Seattle, WA (US); Timothy Michael Muss, Seattle, WA (US); Mark Newton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 10/183,993

(22) Filed: Jun. 28, 2002

(65) Prior Publication Data

US 2005/0259077 A1  Nov. 24, 2005

(51) Int. Cl.
*G09G 5/00* (2006.01)
(52) U.S. Cl. ........................ 345/163; 345/157; 345/164
(58) Field of Classification Search ........ 345/156–169, 345/784, 785, 786, 787; 200/5 A, 6 A; 348/734; 715/784–787; 463/37–38; 273/148 B
See application file for complete search history.

(56) References Cited

U.S. PATENT DOCUMENTS

| | | | |
|---|---|---|---|
| 4,712,101 A | 12/1987 | Culver | |
| 4,720,703 A | 1/1988 | Schnarel, Jr. et al. | |
| 5,063,289 A * | 11/1991 | Jasinski et al. | 250/221 |
| 5,235,868 A | 8/1993 | Culver | |
| 5,404,152 A * | 4/1995 | Nagai | 345/157 |
| 5,446,481 A | 8/1995 | Gillick et al. | |
| 5,477,508 A | 12/1995 | Will | |
| 5,510,811 A | 4/1996 | Tobey et al. | |
| 5,517,257 A | 5/1996 | Dunn et al. | |
| 5,521,617 A * | 5/1996 | Imai et al. | 345/167 |
| 5,530,455 A | 6/1996 | Gillick | |
| 5,771,038 A | 6/1998 | Wang | |
| 5,774,075 A * | 6/1998 | Palalau et al. | 341/35 |
| 5,808,568 A | 9/1998 | Su | |
| 5,910,789 A | 6/1999 | Kim | |
| 5,912,661 A | 6/1999 | Siddiqui | |
| 5,952,997 A | 9/1999 | Hu | |
| 5,956,018 A * | 9/1999 | Pejic et al. | 345/157 |
| 5,959,614 A * | 9/1999 | Ho | 345/167 |

(Continued)

FOREIGN PATENT DOCUMENTS

EP     1258019 B9     11/2002

(Continued)

OTHER PUBLICATIONS

Web page reviewing "Kensington TurboRing Trackball"; http://www.avault.com/hardware/print_review.asp?review=turboring; publication date unknown, but believed to be prior to Jun. 28, 2002.

(Continued)

*Primary Examiner*—Lun-yi Lao
(74) *Attorney, Agent, or Firm*—Banner & Witcoff, Ltd.

(57) ABSTRACT

A scroll wheel assembly includes a rotatable member. Encoded rotation of the rotating member causes scrolling of an image on a display screen along an axis. An actuator is located within the rotational member. Pressure on different parts of the actuator causes scrolling of the image in opposing directions along a second axis. Pressure upon additional parts of the actuator can provide additional screen functions. Functions and commands caused by manipulation of the rotatable member or actuator may also be programmable.

15 Claims, 10 Drawing Sheets

U.S. PATENT DOCUMENTS

| | | | |
|---|---|---|---|
| 5,963,197 | A | 10/1999 | Bacon et al. |
| 6,075,518 | A | 6/2000 | Pruchniak |
| 6,075,575 | A | 6/2000 | Schein et al. |
| 6,097,371 | A | 8/2000 | Siddiqui et al. |
| 6,097,372 | A | 8/2000 | Suzuki |
| D431,037 | S | 9/2000 | Varga et al. |
| 6,128,006 | A | 10/2000 | Rosenberg et al. |
| 6,132,118 | A | 10/2000 | Grezeszak |
| 6,188,393 | B1 | 2/2001 | Shu |
| 6,198,473 | B1* | 3/2001 | Armstrong ............... 345/163 |
| 6,204,838 | B1 | 3/2001 | Wang |
| 6,281,881 | B1 | 8/2001 | Siddiqui et al. |
| 6,300,939 | B1* | 10/2001 | Decker et al. ............ 345/157 |
| 6,323,844 | B1 | 11/2001 | Yeh et al. |
| 6,337,679 | B1 | 1/2002 | Chou |
| 6,340,800 | B1* | 1/2002 | Zhai et al. ............... 200/5 R |
| 6,340,966 | B1 | 1/2002 | Wang et al. |
| 6,348,912 | B1 | 2/2002 | Smith |
| 6,353,429 | B1 | 3/2002 | Long |
| 6,359,611 | B1* | 3/2002 | Chan ....................... 345/156 |
| 6,380,927 | B1 | 4/2002 | Ostrum et al. |
| 6,424,355 | B1* | 7/2002 | Watanabe et al. ......... 345/668 |
| 6,519,003 | B1* | 2/2003 | Swayze ..................... 348/375 |
| 6,522,321 | B1 | 2/2003 | Chen et al. |
| 6,534,730 | B1* | 3/2003 | Ohmoto et al. ............ 200/4 |
| 6,570,108 | B1 | 5/2003 | Lin |
| 6,608,616 | B1 | 8/2003 | Lin |
| 6,697,050 | B1* | 2/2004 | Shinohe et al. ........... 345/163 |
| 6,809,275 | B1 | 10/2004 | Cheng et al. |
| 2002/0149566 | A1* | 10/2002 | Sarkissian .................. 345/168 |
| 2003/0025673 | A1 | 2/2003 | Ledbetter et al. |
| 2003/0076303 | A1* | 4/2003 | Huppi ....................... 345/163 |
| 2003/0095096 | A1* | 5/2003 | Robbin et al. ............. 345/156 |
| 2003/0107547 | A1 | 6/2003 | Kehlstadt et al. |
| 2004/0001042 | A1 | 1/2004 | Lindhout et al. |
| 2004/0051392 | A1* | 3/2004 | Badarneh ................... 307/112 |
| 2004/0150623 | A1 | 8/2004 | Ledbetter et al. |
| 2005/0104854 | A1* | 5/2005 | Su et al. .................... 345/163 |

FOREIGN PATENT DOCUMENTS

| | | | |
|---|---|---|---|
| JP | 07-092939 | * | 4/1995 |
| JP | 2000-200147 | | 7/2000 |

OTHER PUBLICATIONS

Web page reviewing "TurboRing"; http://www.macworld.com/2000/10/reviews/turboring.html; publication date unknown, but believed to be prior to Jun. 28, 2002.

Web page from "Van's Hardware"; http://www.vanshardware.com/reviews/2001/october/011002_TurboRing/011002_TurboRing.htm; published Oct. 2, 2001.

Web page reviewing "TurboRing"; http://www.keyalt.com/pointdevices/turboring.htm; publication date unknown, but believed to be prior to Jun. 28, 2002.

Web page for "Micro TRAC™ "; http://www.microspeed.com/products/pd600s.html; publication date unknown, but believed to be prior to Jun. 28, 2002.

Web page for "Kid TRAC " model PD-280S; http://www.microspeed.com/products/kidtrac.html; publication date unknown, but believed to be prior to Jun. 28, 2002.

Web page for Kid TRAC User's Manual; http://www.microspeed.com/pages/supports/manuals/kidtracm.html; publication date unknown, but believed to be prior to Jun. 28, 2002.

Web page for "Ateck" A4 RFW-33 Radio Wireless PS/2 Mouse; http://www.shop.store.yahoo.com/4itech/a4rfradwirps.html; publication date unknown, but believed to be prior to Jun. 28, 2002.

Web page for "Sakar Yahoo! 4D Internet Scroll Mouse" and "Sakar Optical Mouse w/Email alert Metallic Silver (USB)"; http://www.slarp.com/products/Input_Devices/Mice_and_Trackballs/; publication date unknown, but believed to be prior to Jun. 28, 2002.

Web page for "ICONCEPTS 70152"; http://www.panwebi.com/products/computer/mouse/70152.htm; publication date unknown, but believed to be prior to Jun. 28, 2002.

Web page for "Yahoo 8D Internet Mouse"; http://www.panwebi.com/products/computer/mouse/8dinternetmouse.htm; publication date unknown, but believed to be prior to Jun. 28, 2002.

"Photo A": photograph of scroll wheel from LOGITECH cordless optical mouse, P/N 851497-0000; date of first availability and/or disclosure prior to (or believed to be prior to) application filing date.

"Photo B": photograph of scroll wheel from LOGITECH cordless optical mouse, P/N 851497-0000; date of first availability and/or disclosure prior to (or believed to be prior to) application filing date.

"Photo C": photograph of scroll wheel from mouse manufactured by A4tech Co., Ltd., Taipei, Taiwan; date of first availability and/or disclosure prior to (or believed to be prior to) application filing date.

"Photo D": (second) photograph of scroll wheel from mouse manufactured by A4tech Co., Ltd., Taipei, Taiwan; date of first availability and/or disclosure prior to (or believed to be prior to) application filing date.

"Photo E": photograph of scroll wheel from mouse manufactured by KYE Systems, Taipei, Taiwan; date of first availability and/or disclosure prior to (or believed to be prior to) application filing date.

"Photo F": photograph of scroll wheel frm RAZER "Boomslang" mouse, available from Kama LLC, Taiwan; date of first availability and/or disclosure prior to (or believed to be prior to) application filing date.

<http://www.mside.net/microscrollii,html> , MSIDE.net, showing Micro Scroll II mouse from Micro, 2 sheets, Dec. 2000.

<http://www.contourdesign.com/rollerbar.htm>, Contour Design-RollerBar Mousing Station-Optical Technology, 2 sheets, Jan., 2001 and 1 sheet press release dated Nov. 29, 2000.

<http://www.mousetrapper.dk>, Mouse Trapper product description, 12 color sheets including original Danish language and English translation as performed by Translation Experts Ltd. Service, date of product release unknown but prior to filing date of application.

U.S. Appl. No. 10/158,996 filed Jun. 3, 2002.

* cited by examiner

INPUT DEVICE INCLUDING A SCROLL WHEEL ASSEMBLY FOR MANIPULATING AN IMAGE IN MULTIPLE DIRECTIONS

FIELD OF THE INVENTION

The present invention relates to an input device including an assembly for moving an image in multiple directions on a display screen. More particularly, the present invention relates to a scroll wheel assembly that, when part of a peripheral or integral input device that is operatively connected to a host computer, can move an image in multiple axes relative to the display screen.

BACKGROUND OF THE INVENTION

The viewable contents of a computer file, such as a text document, spreadsheet, digital photograph, Web page, or other image rendered on a conventional display screen, may possess a size exceeding the viewable boundaries of the display screen. To address this issue, an individual may utilize a scrolling method to scroll the image relative to the display screen. Scrolling, as used herein and as is known in the art, describes the movement of an image relative to a display screen in a particular direction. For example, "scrolling down" generally describes moving the viewable contents of a file (such as a text document or image) relative to a display screen so as to produce an effect of moving down in the document or image. Similarly, the terms scroll up, scroll left and scroll right relate to moving the viewable contents of a file relative to a screen so as to produce an effect of moving a document or image up, left, and right, respectively. The term scrolling as used herein also includes panning, which is the automatic and/or continuous scrolling of an image, often in response to a single command or input.

Scroll wheels have been provided on computer mice, and have been used by computer operators to move an image on a display screen. A scroll wheel assembly typically includes a rotatable scroll wheel and a sensor to measure and encode rotation. Typically, the scroll wheel is located within a housing of a mouse or other peripheral computer device. A portion of the scroll wheel protrudes upwardly out of an opening in the housing, and is rotated in order to vertically scroll the image displayed on the screen. An example of a mouse including a known scroll wheel assembly is described in U.S. Pat. No. 5,912,661, entitled "Z-ENCODER MECHANISM" which is hereby fully incorporated by reference.

In operation, a conventional scroll wheel is normally rotated about a transversely extending axis secured within a housing. An encoder wheel is coupled to the scroll wheel and rotates when the scroll wheel rotates. As the scroll wheel is rotated, an encoder senses the rotation of the encoder wheel, and delivers a corresponding signal to a host computer. That signal can be used to move an image, as is known in the art and disclosed in U.S. Pat. No. 5,912,661. Notably, this allows a user to scroll the image without changing the position of the mouse and/or the cursor, and instead only requires rotating the scroll wheel (versus the entire mouse or other device) with a thumb or finger. However, displayable portions of spreadsheets and many other types of documents and screen images are often wider than the display screen, and the user must also scroll horizontally across the screen to see the entire file. When the user needs to move the image horizontally across the display screen, the user must typically perform additional steps beyond what is required for vertical scrolling. This can include locating a graphical user interface in the form of a horizontal scroll bar (usually located near the bottom of the display), positioning the cursor on the scroll bar, and then rotating the wheel. Locating the scroll bar can be very difficult for people with bad eyesight, small display screens and/or poor hand-eye coordination. Using a horizontal scroll bar also requires a user to shift his or her gaze from the portion of the document being viewed, and then relocate that portion after horizontal scrolling. Even if the size of the horizontal scroll bar and/or the screen resolution can be adjusted, the user must nevertheless perform additional pointing tasks which are more time-consuming and mentally intensive than simply rotating a wheel or pushing a button. Alternative graphically assisted tools for horizontal scrolling (e.g., positioning a cursor over a horizontal scroll bar, selecting the scroll bar, and moving the cursor) also require cursor repositioning, and have similar drawbacks.

Microside Corporation of Miami, Fla. offers a "Micro Scroll II" mouse that permits a user to scroll an image in multiple perpendicular directions. This mouse includes a first rotatable wheel for scrolling an image up and down, and a second, separate rotatable wheel for scrolling an image left and right. The rotatable wheels are oriented so they extend and rotate in planes that are perpendicular to each other. The two scroll wheels are independently operable. However, this arrangement has drawbacks. The two wheels take up limited space on the upper surface area on the mouse, which could be used for supporting the hand of the user or for additional input keys. Further, the two wheels are relatively small in size so as to accommodate both wheels on the upper surface of the mouse. The smaller sized scroll wheels make the scrolling more difficult to control. Additionally, the location of the horizontal scroll wheel can be inconvenient for effective control. Further, with this design, it might be difficult for some users to easily reach and manipulate both of the wheels.

Accordingly, there remains a need for improved input devices facilitating scrolling in multiple directions.

SUMMARY OF THE INVENTION

The present invention allows a user to conveniently scroll a screen image, in multiple directions, with simple thumb or finger movements. In one embodiment, the invention includes a scroll wheel assembly having a rotatable member attached to a device for sensing and encoding rotational motion. The encoded rotational motion in turn causes scrolling of an image on a display screen along an axis. Positioned within the rotatable member is an actuator that, in response to pressure on different parts of the actuator, can scroll the image along a second axis. The scroll wheel assembly can be used in a mouse, in a keyboard, in a trackball, in an internet appliance, in a notebook computer, in a tablet computer, in a pocket computer, in a Personal Digital Assistant, and in other applications where multidirectional scrolling is desired or useful. Pressure upon additional parts of the actuator can, in some embodiments, provide additional screen functions. Functions and commands corresponding to manipulation of the actuator and/or rotatable member may also be programmable.

In one embodiment, the invention includes an input device that is in communication with the display device screen. The input device has a housing with an opening defined therein. An actuator is positioned within the input device, and at least part of that actuator protrudes through the opening. The actuator has at least two actuated conditions. Distinguishable signals are generated in those actuated conditions. A rotational member surrounds the actuator, and also protrudes at least partially through the opening. The rotational member is rotatable with respect to the housing, and continuously rotatable through multiple complete revolutions.

Further advantages and features of the invention are set forth in the detailed description.

DETAILED DESCRIPTION OF THE INVENTION

Figure 1:
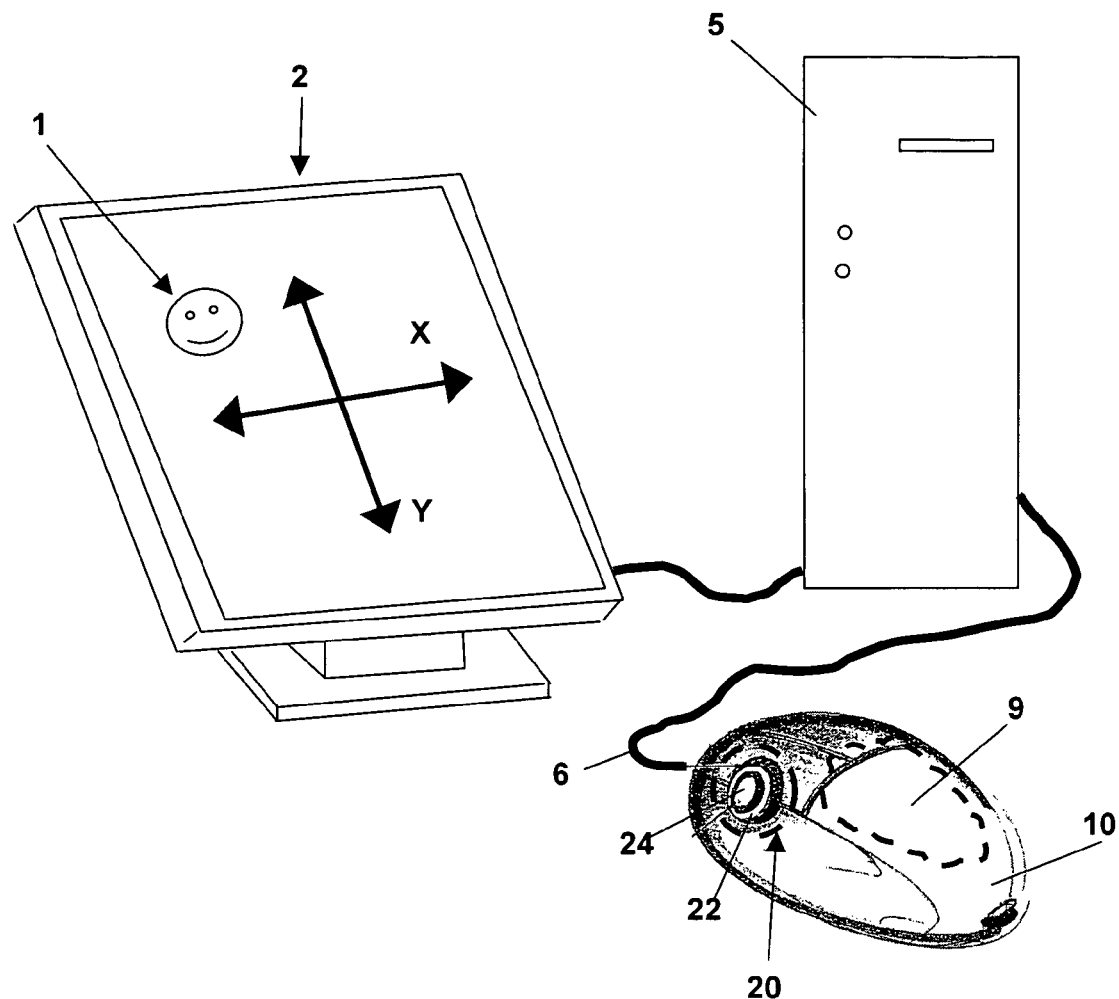
FIG. 1 illustrates one input device according to the present invention for scrolling an image in multiple directions on a display screen of a host computer.

FIGS. 1–7 illustrate an exemplary embodiment of a scroll wheel assembly 20 of the present invention as adapted for use in an input device such as computer mouse 10. For convenience, the invention will first be described with reference to the mouse 10 of FIG. 1. However, the invention is not so limited, and as set forth in detail below, can be used in multiple devices and in multiple configurations. Scroll wheel assembly 20 includes a rotatable member 22 and a button 24. Rotatable member 22 will generally (though not necessarily) be round. For convenience, rotatable member 22 will hereinafter be referred to as a scroll wheel. However, and as set forth herein, rotatable member 22 could also be used as a "zoom" wheel, a volume control, or for other purposes. By rotating scroll wheel 22, an image 1 (which may be text, graphics, a combination of text and graphics, or other displayable information) on the screen of display 2 may be moved up or down along a Y-axis. By pressing button 24, image 1 may be scrolled from left to right along a X-axis. Mouse 10 is in communication with computer 5 via wire 6, and thereby also communicates with display 2 (as used herein, "communicate" includes both direct communication with a device and indirect communication via intermediary devices and/or software). Mouse 10 also receives power via cord 6. Alternatively, mouse 10 could communicate by wireless connection and/or be battery powered.

Figure 2:
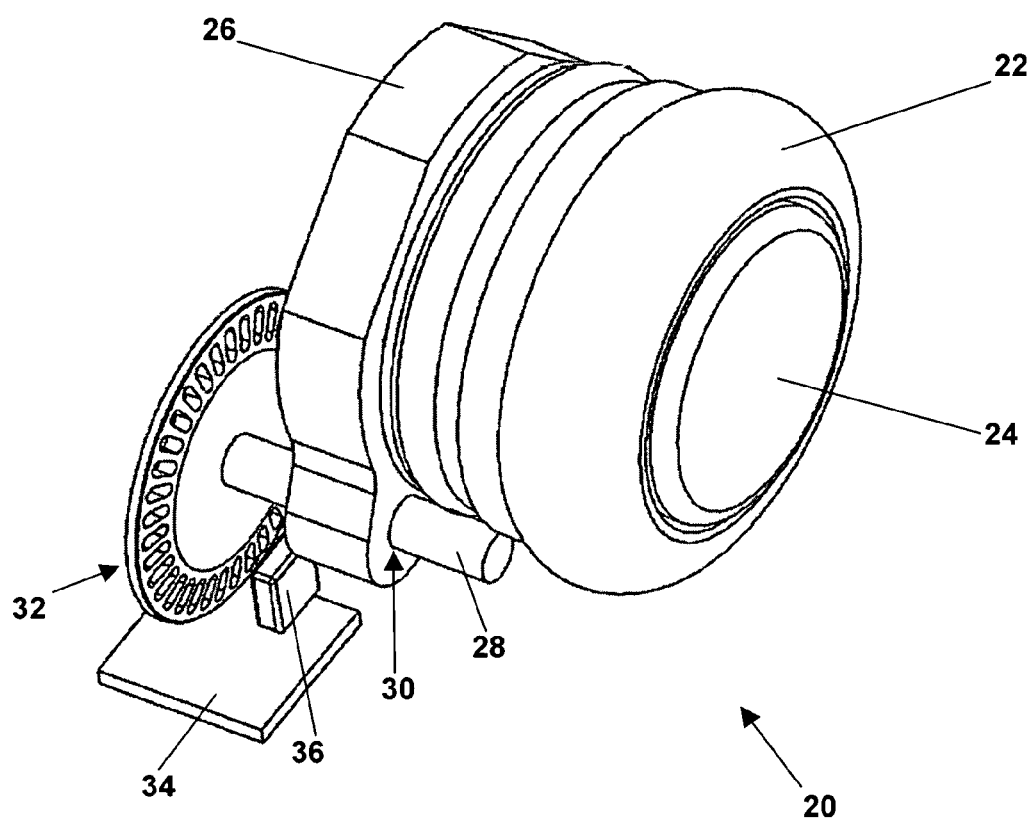
FIG. 2 is a perspective view of one embodiment of a scroll wheel assembly according to the present invention.

FIG. 2 is an enlarged perspective view of scroll wheel assembly 20 enclosed by the dashed circle in FIG. 1, but separated from the housing and other components of mouse 10. The illustrated embodiment includes a main body 26. An encoder shaft 28 is rotatably held by main body 26 in hole 30. One end of encoder shaft 28 is in contact with a side portion of the scroll wheel 22. Attached to encoder shaft 28 on the opposite side of main body 26 is encoder wheel 32. When the scroll wheel 22 rotates with respect to main body 26, friction between encoder shaft 28 and the side of scroll wheel 22 causes encoder shaft 28 to rotate. Encoder shaft 28 thereby rotates encoder wheel 32, which lies between elements of encoder 34. As scroll wheel 22 rotates, the rotational motion is thus sensed by encoder 34, and the image 1 is scrolled in either a positive or a negative vertical direction that extends parallel to the Y-axis on display 2. As known in the art, encoder 34 can include a light source 36 and a light detector (shown as item 38 in FIG. 3). Blades on encoder wheel 32 periodically obstruct the light beam when encoder wheel 32 rotates. The light detector senses these obstructions and is coupled to a controller (not shown) to generate and relay a signal to the host computer 5 to scroll the image up or down in the Y-direction. Further details of an exemplary encoding system are disclosed in U.S. Pat. No. 5,912,661, previously incorporated by reference. Although one encoding system has been shown, any system capable of sensing and encoding rotation of scroll wheel 22 may be used.

Figure 3:
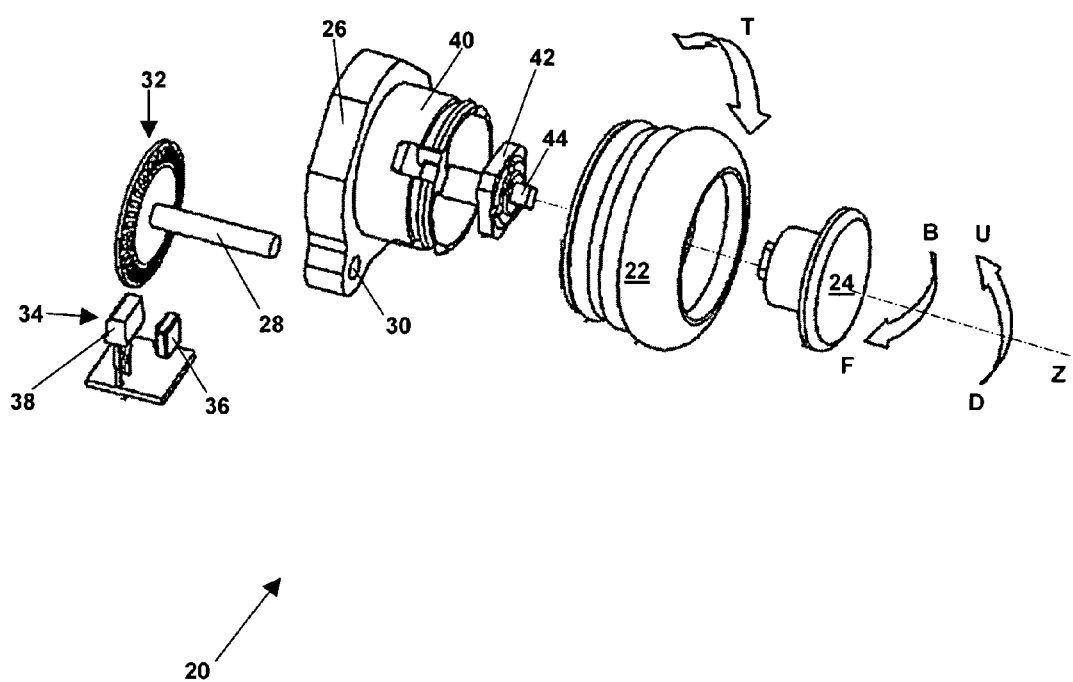
FIG. 3 is an exploded perspective view of the scroll wheel assembly of FIG. 2.

FIG. 3 is an exploded perspective view of the scroll wheel assembly 20 of FIG. 2. As shown in FIG. 3, main body 26 includes a generally cylindrical portion 40. Scroll wheel 22 fits over cylindrical portion 40 and rotates about portion 40, as shown by double-headed arrow T. Disposed within a hollow region of cylindrical portion 40 is switch 42. Switch 42, which may be of various types known in the art and available from multiple commercial sources in various configurations (including, for example, a 5-position switch, available from Panasonic Industrial Co. of Suwanee, Ga., having part number EVZQ5A05K), allows distinguishable signals to be generated for movement of the switch in different directions, or from force exerted on the switch in different directions. For example, switch 42 may have multiple internal electrical contacts, such that movement of the switch element 44 away from axis Z in different directions closes different contacts. Switch 42 may include potentiometers located at various positions; movement in different directions away from axis Z would cause changes in resistance in different circuits, allowing detection of degrees of movement in various directions. Switch 42 may be of a type that does not require any appreciable movement of a switch element. For example, separate piezoelectric elements could be located at various positions around the central axis Z within switch 42. Exerting force upon switch element 44 in a particular direction would exert pressure on one or more corresponding piezoelectric components, and a signal generated that corresponds to the force in that direction. Other types of switches, or combinations of switches, could also be used.

In the example of FIGS. 1–7, mouse 10 could be configured such that tilting element 44 in the direction of arrow U (FIG. 3) could cause an image on display 2 to move (scroll) to the right along the X axis. If element 44 were instead tilted in the direction of arrow D, the image could instead scroll to the left along the X axis. Mouse 10 could be further configured so that tilting in the "F" or "B" directions scrolls an image up or down; this may occur at a different rate than a user might normally scroll by turning scroll wheel 22. Mouse 10 could even be configured so that tilting element 44 in the directions of arrows F or B duplicates the effect of tilting in the U or D directions (e.g., tilting in the "F" direction moves the image to the right and tilting in the "B" direction moves the image to the left, or vice versa). In this manner, a computer input device having scroll wheel assembly 20 could accommodate different users, some of whom may find it easier to tilt button 24 from side to side instead of up and down. As yet another alternative, tilting in the "F" and "B" directions could be assigned other functions, such as panning; zooming in or out; adjusting focus, brightness or other display characteristics; adjusting sound volume; and numerous other functions and commands.

Scroll wheel assembly 20 may also be part of an input device wherein the functions or commands corresponding to button 24 and/or scroll wheel 22 are programmable by the user. The user would thus be able to assign any of numerous functions to button 24, or even assign different functions to rotation of wheel 22. Moreover, switch 42 need not be limited to a switch with only 4 conditions, or that only responds to tilting of element 44 away from axis Z. For example, pushing element 44 along axis Z could create (or allow creation) of a distinguishable signal. Switch 42 might also be of a type that, in addition to allowing distinct signals for movement (or force) in "B," "F," "U" or "D" directions, allows for signals indicative of combinations of such movement or forces. In other words, and as one example, movement of switch element 44 in a diagonal direction between the "F" and "U" directions (or to approximately 9:00 if the face of button 24 in FIG. 3 were a clock), could scroll an image in a diagonal screen direction. Movement in other diagonal directions could scroll in other diagonal screen directions.

Figure 4:
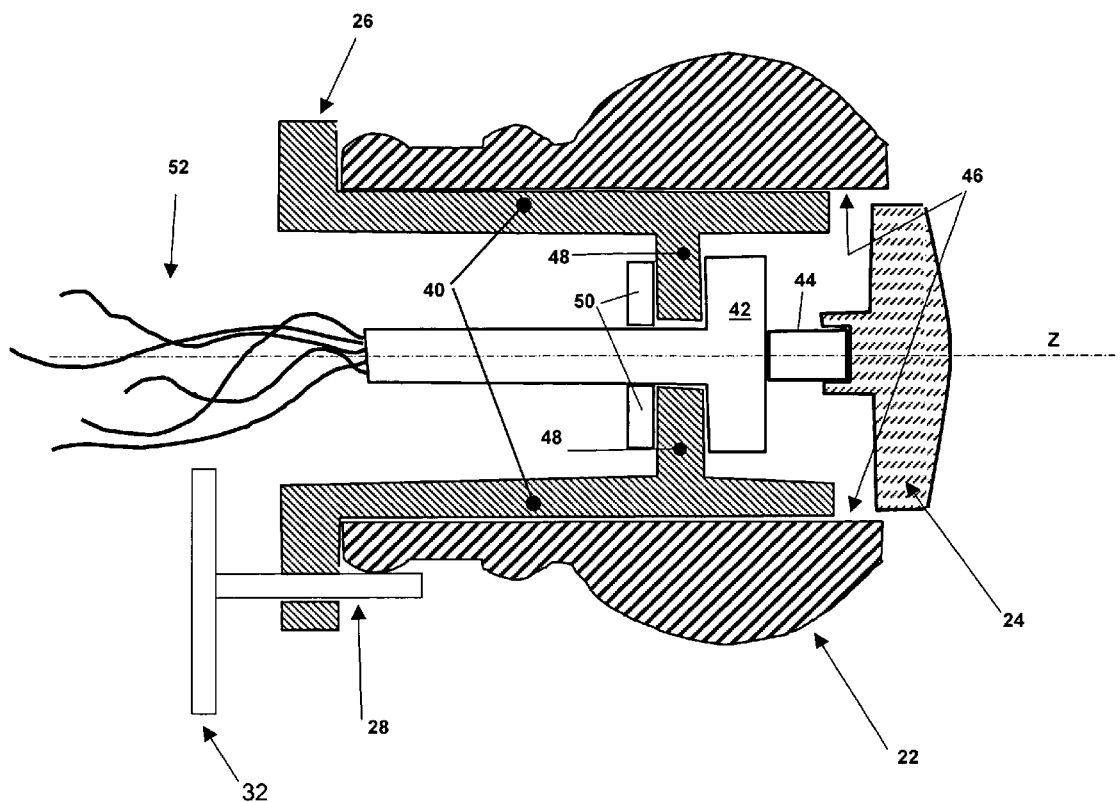
FIG. 4 is partial cross section, in partially schematic form, of the scroll wheel assembly of FIG. 3.

FIG. 4 is a cross section of scroll wheel assembly 20 showing arrangement of various components. Cylindrical portion 40 of main body 26 fits within the center 46 of scroll wheel 22. Although not shown, scroll wheel 22 can be rotatably attached to main body 26 by numerous mechanical arrangements known in the art. Such attachments include, but are not limited to, matching grooves and ribs (e.g., a groove formed in portion 40 and a rib formed in center 46, or vice versa). Switch 42 fits within cylindrical portion 40, and may rest against a shoulder 48 formed inside cylindrical portion 40. A suitable fastener 50 (e.g., a nut, a push-on fastener, a retainer ring, etc.) may hold switch 42 in place against shoulder 48. Switch 42 could alternatively be glued in place; could be held in place by a tight or force fit; or attached in other known manners. Emanating from switch 42 are multiple conductors 52, which are electrically connected to the input device. Preferably, conductors 52 are connected to a controller (not shown) that interprets the output from switch 42, converts it to a signal indicating the direction (and optionally, the magnitude) in which switch element 44 was moved (or the location and/or magnitude of exerted force), and delivers the signal to the host computer 5. Preferably, the same controller receives signals from encoder 36 and switch 42. The controller can be any known component or combination of components that can receive input from encoder 36 and/or switch 42, and provide appropriate output signals. In one embodiment, the controller includes a microprocessor. With regard to button 24, the controller could thus provide a signal that scrolls the image 1 in a manner that is consistent with the direction (and magnitude, if desired) of the force applied to button 24.

Figure 5:
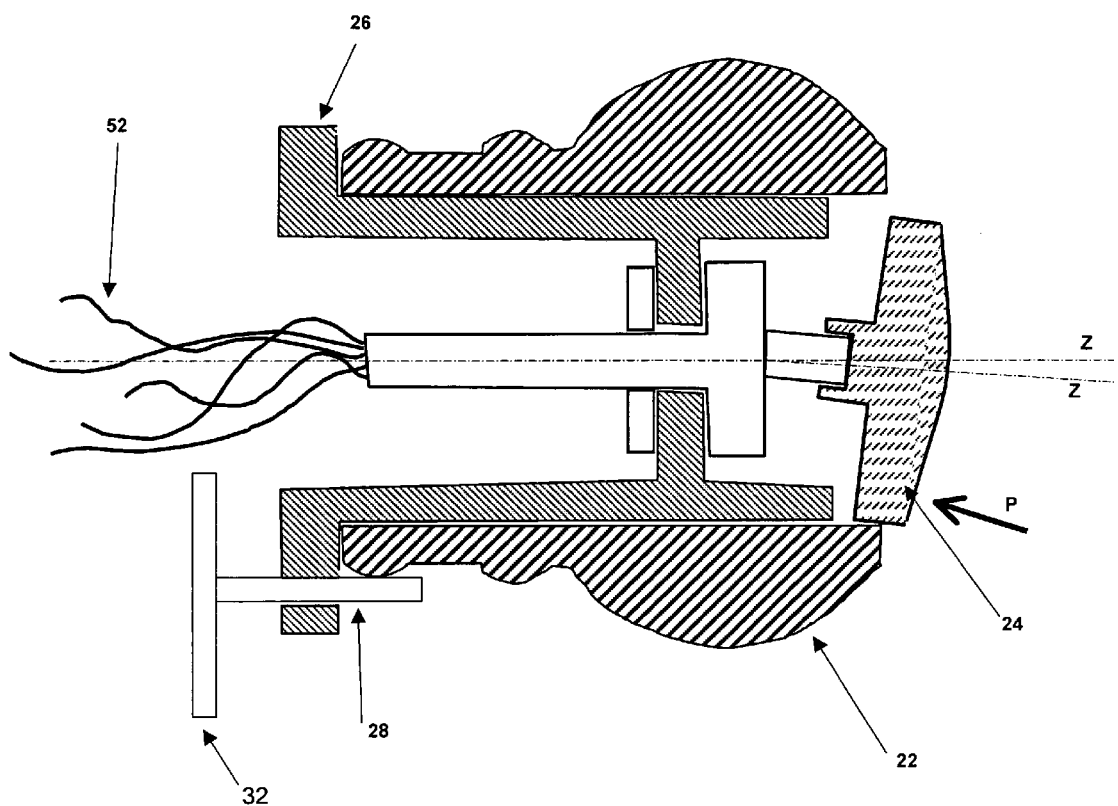
FIG. 5 is partial cross section similar to FIG. 4, but showing button 24 in an actuated condition.

Button 24 is attached to switch element 44 by force fit, by adhesive, or by other known manner of attachment. Button 24 rests within the center of scroll wheel 22. FIG. 5 illustrates actuation of one type of switch 42. A user actuates switch 42 by pressing upon button 24 as indicated by arrow P. Button 24 thereby tilts element 44 from its neutral (i.e., unactuated) position (axis Z) to an actuated position (axis Z'). Element 44, and thus button 24, are preferably biased in an "untilted" position. Of course, the user could also press down upon another location on the surface of button 24 to tilt button 24 (and thus, element 44) in a different direction, and thereby generate a different signal.

Figure 6:
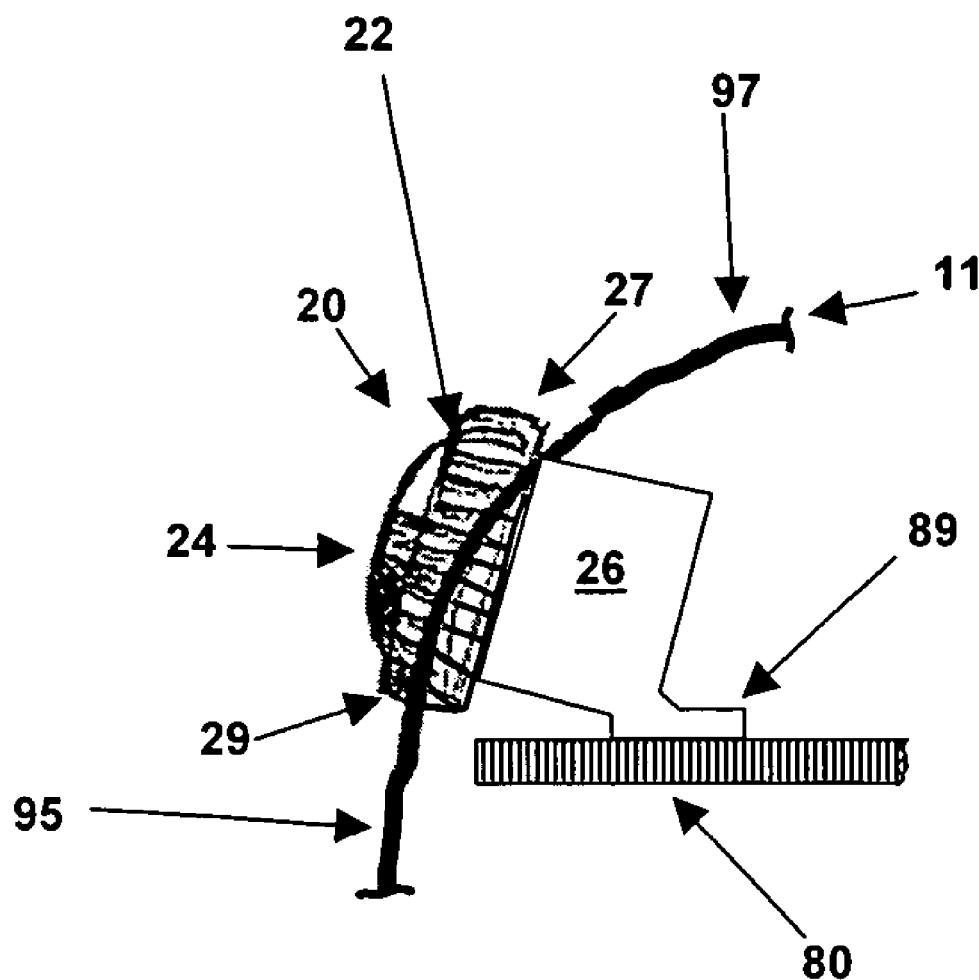
FIGS. 6 and 7 are partially schematic, partial cut-away views of various mounting arrangements for the scroll wheel assembly of the invention within a computer mouse.
Figure 7:
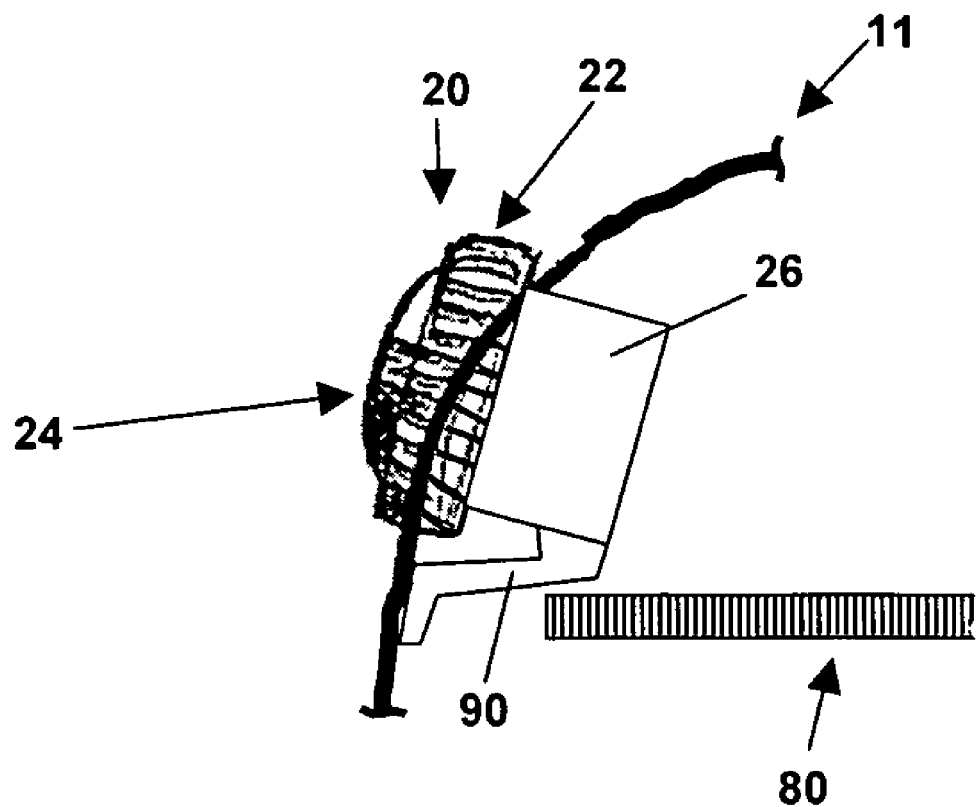

Scroll wheel assembly 20 can be attached to mouse 10 or other input device in any suitable manner. As shown in FIG. 6, for example, scroll wheel assembly 20 could be modular in design and mounted upon a circuit board 80. A small mounting bracket 89 or other appropriate fixture could be attached to, or formed as an integral part of, main body 26. Alternatively, scroll wheel assembly 20 could be mounted to the inside surface of the device housing as shown in FIG. 7, via an attached or integral bracket 90. The scroll wheel 22 and button 24 can then be accessed through an opening in the housing 11 of mouse 10. Other mounting arrangements are within the scope of the invention, and readily apparent to persons skilled in the art once such persons are provided with the disclosures herein.

FIGS. 1, 6 and 7 further illustrate an additional aspect of the invention. Specifically, the scroll wheel assembly is located on a side of mouse 10 and in a position where scroll wheel 22 can easily be gripped by the thumb and index finger of a user when the palm of the user's hand contacts the upper surface of the mouse 10. Although only intended as one example, the irregularly shaped dashed area 9 in FIG. 1 represents a typical area where a user's palm might contact the mouse 10 when holding the mouse for movement across a work surface. Actual placement might vary by user. As is apparent, however, this placement allows a user to conveniently scroll a display in multiple directions when the user is simultaneously holding the mouse 10 in a manner to move the mouse across a work surface. As seen in FIG. 6, scroll wheel assembly 20 may also be positioned in a transition area lying between a generally steep-sloped side region 95 and a generally shallow-sloped top region 97. In this manner, more surface area is exposed along the upper portion 27 of the circumference of scroll wheel 22 than is exposed along the lower portion 29 of the circumference of scroll wheel 22. This positioning accommodates the greater range of motion or dexterity that a user might have in an index finger (contacting upper portion 27) than in a thumb (contacting lower portion 29).

Numerous other modifications to scroll wheel assembly 20 are also possible, and within the scope of the invention. For example, instead of friction between encoder shaft 28 and scroll wheel 22, gear teeth could be formed on encoder shaft 28 and around a peripheral portion of scroll wheel 22. As another example, scroll wheel 22 and encoder wheel 28 could be arranged so as to rotate coaxially. Detents could also be incorporated into the scroll wheel assembly 20 such that rotation of scroll wheel 22 provides a user with an indexed tactile sensation as the scroll wheel 22 is rotated. Other types of switches could also be used. For example, instead of a single, centrally-located switch, several individual switches could be located in various sectors of button 24. Moreover, instead of the switch (or switches) being normally open and then closed by pressure on button 24, a switch (or switches) could be normally closed and then opened by pressure upon button 24. Additionally, other well-known pressure and movement sensors such as optical sensors and mercury switches could be used.

As with the type of switch(es) used, the invention is not limited by materials from which the scroll wheel assembly 20 can be composed. However, exemplary materials for main body 26, button 24, scroll wheel 22, encoder wheel 32 and encoder shaft 28 include any suitable plastic or non-plastic material. The invention is similarly not limited by the precise dimensions of the various components. However, when incorporated into a computer mouse, scroll wheel 22 preferably has an outer diameter in the range of about 15 millimeters (mm) to about 35 mm, and more preferably has an outer diameter in the range of about 25 mm to about 30 mm. In a preferred embodiment, the diameter of the scroll wheel 22 is about 28 mm. Similarly, when used in a computer mouse, button 24 preferably has an outer diameter in the range of about 10 mm to about 25 mm, and more preferably has an outer diameter in the range of about 15 mm to about 20 mm, and even more preferably of about 17 mm.

Figure 8:
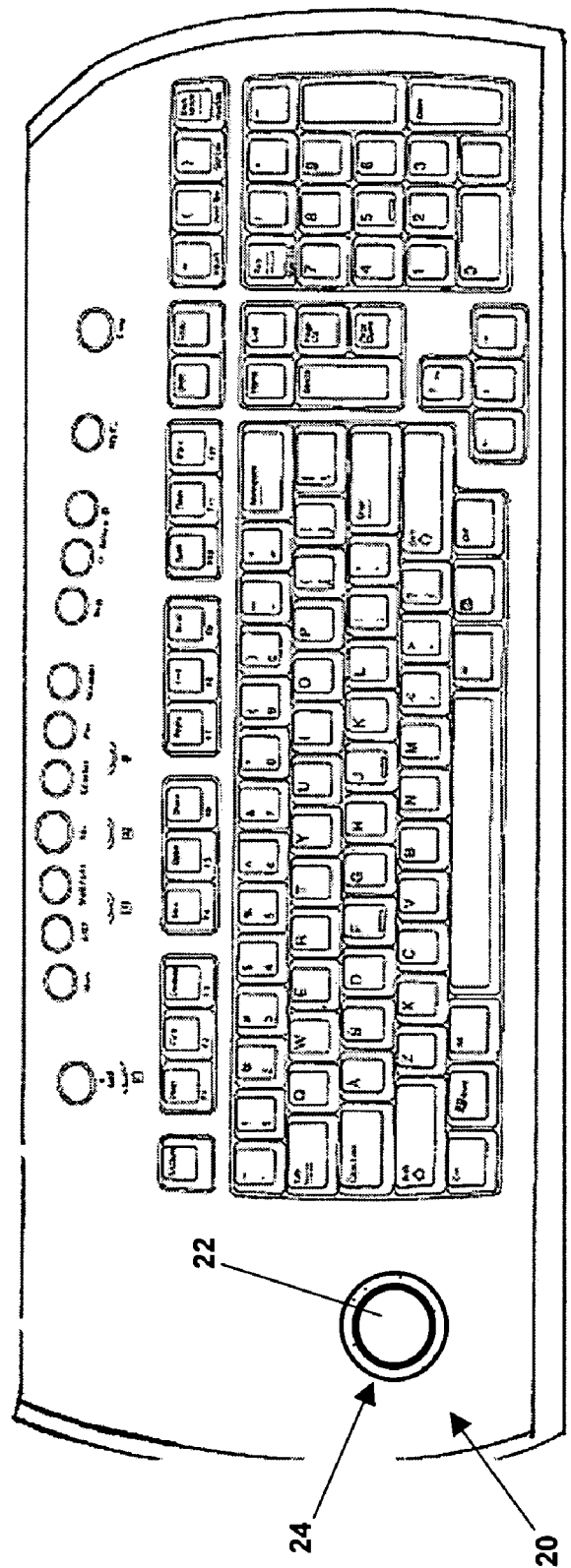
FIG. 8 is a drawing of a scroll wheel assembly according to the present invention as part of a keyboard.

Scroll wheel assembly 20 can also be incorporated into other input devices. For example, scroll wheel assembly 20 could be located on a keyboard (FIG. 8). Alternatively, the scroll wheel assembly 20 could be located on a trackball device or a similar input device. Scroll wheel assembly 20 could be located in the bezel of a hand-held computer; in a larger portable computing device; in a web pad; in an internet appliance; or on a laptop computer. The scroll wheel assembly 20 could alternatively be located in a computer monitor, or as part of a computer kiosk.

As suggested above, the scroll wheel assembly of the present invention could be configured or configurable to move an image along a Y axis when scroll wheel 22 is rotated, and along an X axis when button 24 is pressed. Of course, these functions could be reversed (i.e., scroll on the X axis for wheel rotation and on the Y axis for button actuation). However, the orientation of the scrolling axes corresponding to scroll wheel 22 and button 24 is not limited to conventional X and Y axes. For example, rotation of scroll wheel 22 could scroll an image along some other axis that is rotated any arbitrary angle with respect to a conventional X (or Y) axis. Similarly, pressing button 24 could scroll an image along any arbitrarily chosen axis. The axes corresponding to scroll wheel 22 and button 24 need not be perpendicular to one another. Alternative modes of multidirectional movement are also within the scope of the invention. As but one example, scroll wheel assembly 20 could scroll in a polar coordinate scheme, with rotation of scroll wheel 22 rotating a screen image about some axis, and pressing of button 24 moving the image radially. An input device could be configured such that either the button 24 or scroll wheel 22 moves a displayed image along a "Z" axis on the display, i.e., enlarges or reduces the image size.

Horizontal (or other directional) scrolling could occur in a various ways in response to pressure upon button 24. In one embodiment, the image 1 will scroll across the display 2 at a constant, predetermined speed (i.e., panning) as long as the button 24 is pressed. The scrolling speed may be programmed, set, or changed by a user via numerous known techniques. Alternatively, the scrolling could be time sensitive. For example, the scrolling may be at a first speed when the button 24 is pressed for a first period of time. If button 24 remains pressed longer than that first period of time, the scrolling speed may be increased. Switch 42 could sense degrees of actuation force or distance (e.g., how hard the user is pushing the activation element in a certain direction, or how far off the Z axis the element has moved), and the scroll speed increased for increased actuation force (or distance). A user input device incorporating scroll wheel assembly 20 might also be configured to avoid inadvertent movement of screen images because of accidental bumping or other unintentional movement of button 24. For example, before a screen image would be scrolled or otherwise affected, a user may be required to press button 24 with force above a certain threshold and/or for an amount of time above a particular threshold.

The scroll wheel assembly 20 could also be used to execute commands other than "scroll right" and "scroll left" (or "scroll up" and "scroll down"). For example, and similar to keys on mice and keyboards, various positions of button 24 could programmable. Pressing button 24 in one direction could activate a pre-programmed command such as "BACK", and pressing button 24 in another direction could activate a pre-programmed command such as "FORWARD." Other positions of button 24 could similarly be programmable. Indeed, scroll wheel 22 could also be programmable to perform functions in addition to scrolling; these could include functions affecting a visual display, as well as functions not affecting a visual display (e.g., adjusting sound volume). Further, with the use of modifier keys, it is possible to expand the number of available functions. For example, the combined actions of an "Alt" keystroke and rotation of scroll wheel 22 could control zooming in and out; the combination of a modifier key and pressing button 24 could angularly rotate an image on the display, such as a drawing object. Pressing the "Alt" and "F" keys could increase the rate at which an image is scrolled (or otherwise moved on the display) when button 24 is pressed (or when scroll wheel 22 is rotated). Numerous other alternatives are possible and readily apparent to persons skilled in the art in light of the disclosures herein. Programming of these additional functions (as well as of other functions described herein) could be achieved with software incorporated into firmware within the user input device; as part of hardware driver software operating on a computer (or other device) in communication with the input device; or in other manners known in the art.

Figure 9A:
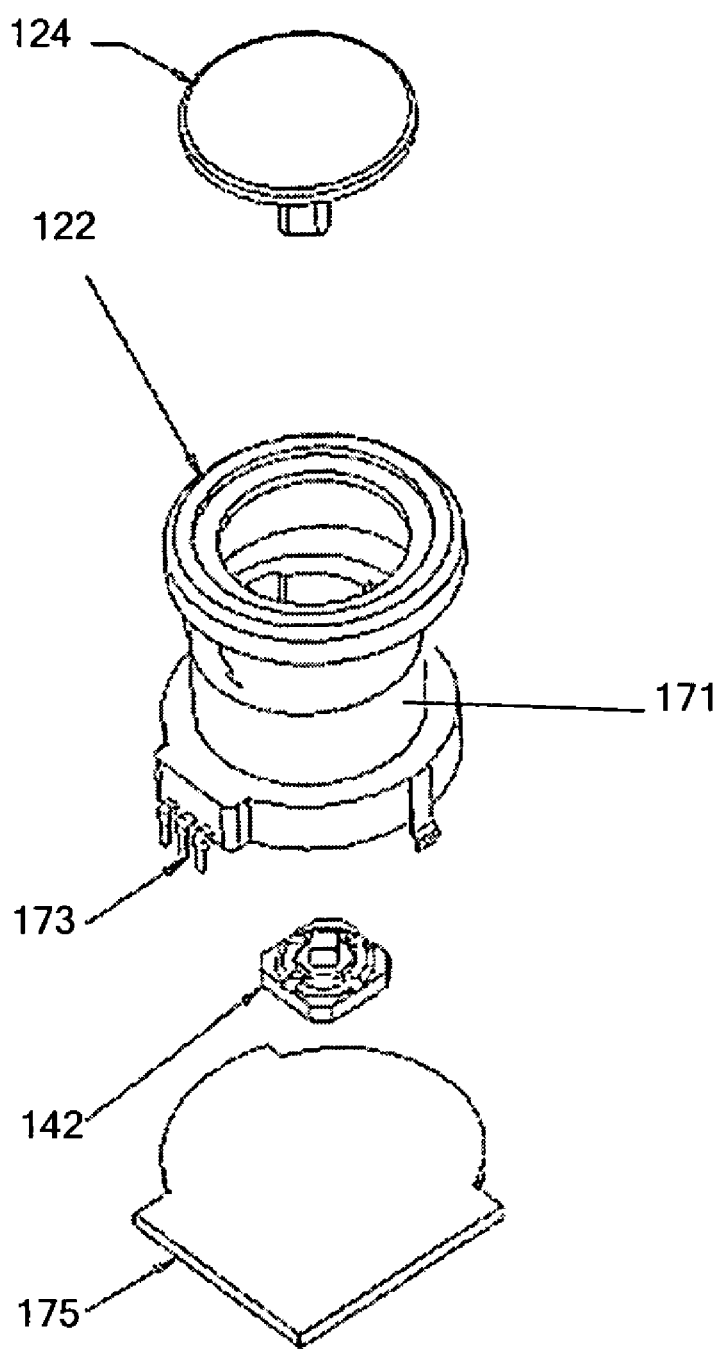
FIGS. 9A–9D show an another embodiment of a scroll wheel assembly according to the present invention.
Figure 9B:
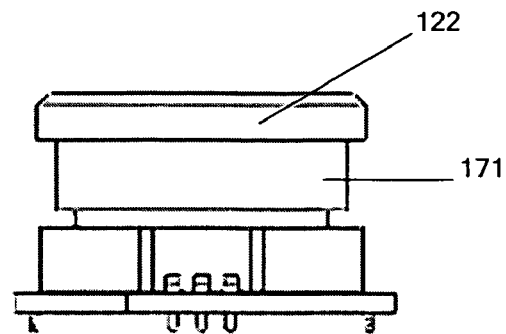
Figure 9C:
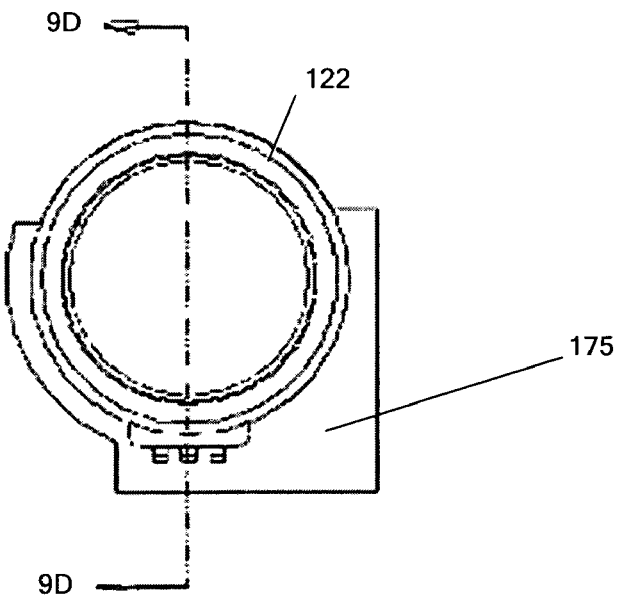
Figure 9D:
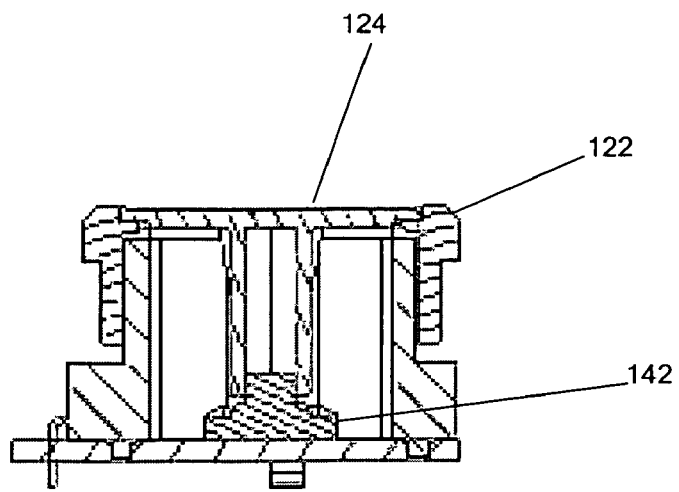

FIG. 9A shows an exploded view of another embodiment of a scroll wheel assembly according to the present invention. As shown in FIG. 9A, rotatable member 122 could be part of a commercially-available rotary encoder 171 (such as might be used in, e.g., an automotive stereo) having a sufficiently large open space in the center. Rotary encoder 171 may have leads 173 that connect to a printed circuit board 175. Switch 142 is similar to switch 42 described above, and fits within the open space in the center of rotary encoder 171. Button 124 attaches to switch 142. FIGS. 9B, 9C and 9D are, respectively, side, top and cross section views of the embodiment shown in FIG. 9A.

Although several examples of carrying out the invention have been described, those skilled in the art will appreciate that there are numerous variations and permutations of the above described examples that fall within the spirit and scope of the invention as set forth in the appended claims. In addition to the alternatives and variations already discussed, further variations are possible and within the scope of the invention. For example, the illustrated locations of scroll wheel assembly 20 on a mouse or keyboard are examples only. Scroll wheel assembly 20 could be positioned in a different place on an input device (such as for accommodation of left-handed users). Various functions described for button and wheel movements can be rearranged or otherwise altered in manners in addition to those already suggested. Additional buttons could be located just outside the perimeter of, or otherwise in close proximity to, the scroll wheel. These and other modifications are within the scope of the invention, which is only limited by the attached claims.

The invention claimed is:

1. A device for manipulating an image on a display device screen, comprising:
    an input device in communication with the display device screen, the input device including a housing having an opening defined therein;
    an actuator positioned within the input device and at least partially protruding through the opening, the actuator having at least two actuated conditions in which distinguishable signals are generated;

a rotational member surrounding the actuator and at least partially protruding through the opening, the rotational member being rotatable with respect to the housing and continuously rotatable through multiple complete revolutions;

an encoder for encoding amounts by which the rotational member is rotated, wherein the actuator has a limited range of motion, the actuator is engageable independent of the rotational member; and a cylindrical portion, wherein the rotational member rotates about the cylindrical portion, and the actuator is positioned at least partially inside the cylindrical portion.

2. The device of claim 1, wherein the input device is a computer mouse.

3. The device of claim 1, wherein the input is a keyboard.

4. The device of claim 1, wherein the actuator is an electrical switch having at least two positions corresponding to the at least two actuated conditions.

5. The device of claim 1, wherein the actuator includes potentiometers located at various positions such that movements in different directions away from a longitudinal switch axis causes resistance changes in different circuits.

6. The device of claim 1, wherein the actuator includes piezoelectric elements and is engageable without appreciable movement.

7. The device of claim 1, wherein:

the actuator has a longitudinal axis, and movement of the actuator parallel to the longitudinal axis places the actuator in a third actuated condition in which a distinguishable signal is generated.

8. The device of claim 1, wherein:

the actuator has a longitudinal axis, tilting the actuator away from the longitudinal axis in a first direction places the actuator in a first of the at least two actuated conditions, and tilting the actuator away from the longitudinal axis in a second direction places the actuator in a second of the at least two actuated conditions.

9. The device of claim 8, wherein:

tilting the actuator away from the longitudinal axis in a third direction places the actuator in a third of the at least two actuated conditions, and tilting the actuator away from the longitudinal axis in a fourth direction places the actuator in a fourth of the at least two actuated conditions.

10. The device of claim 8, wherein the actuator is biased against movement away from the longitudinal axis.

11. The device of claim 8, wherein at least one of the distinguishable signals corresponds to at least one of panning, zooming in or out, adjusting focus, adjusting brightness and adjusting sound volume.

12. The device of claim 8, wherein:

the actuator is placed in the first actuated condition by imposition of a first force in a first direction, the actuator is placed in the second actuated condition by imposition of a second force in a second direction, the actuator is placed in a modified first actuated condition by imposition of a third force in the first direction, the actuator is placed in a modified second actuated condition by imposition of a fourth force in the second direction, distinguishable signals are generated when the first force is imposed on the actuator in the first direction and when the third force is imposed on the actuator in the first direction, and distinguishable signals are generated when the second force is imposed on the actuator in the second direction and when the fourth force is imposed on the actuator in the second direction.

13. The device of claim 8, wherein:

the actuator is placed in the first actuated condition by moving the actuator a first distance in a first direction, the actuator is placed in the second actuated condition by moving the actuator a second distance in a second direction, the actuator is placed in a modified first actuated condition by moving the actuator a third distance in the first direction, the actuator is placed in a modified second actuated condition by moving the actuator a fourth distance in the second direction, distinguishable signals are generated when the actuator is moved the first distance in the first direction and when the actuator is moved the third distance in the first direction, and distinguishable signals are generated when the actuator is moved the second distance in the second direction and when the actuator is moved the fourth distance in the second direction.

14. The device of claim 1, further comprising:

an encoder shaft rotating in response to rotation of the rotational member; and an encoder wheel attached to the encoder shaft and rotatable within the encoder.

15. The device of claim 1, wherein rotation of the rotational member corresponds to increasing or decreasing sound volume.

* * * * *